US009730394B2

(12) United States Patent
Van De Vegte et al.

(10) Patent No.: US 9,730,394 B2
(45) Date of Patent: Aug. 15, 2017

(54) GRAZE HARVESTING OF MUSHROOMS

(71) Applicant: Vineland Research and Innovations Centre Inc., Vineland Station (CA)

(72) Inventors: John Van De Vegte, Cambridge (CA); Michael Lawson, Burlington (CA); John Renfrew, Dundas (CA); Koshy Mathew, Ajax (CA)

(73) Assignee: Vineland Research and Innovations Centre Inc., Vineland Station (CA)

( * ) Notice: Subject to any disclaimer, the term of this patent is extended or adjusted under 35 U.S.C. 154(b) by 0 days.

(21) Appl. No.: 15/292,402

(22) PCT Filed: Apr. 17, 2015

(86) PCT No.: PCT/CA2015/050321
§ 371 (c)(1),
(2) Date: Oct. 13, 2016

(87) PCT Pub. No.: WO2015/164958
PCT Pub. Date: Nov. 5, 2015

(65) Prior Publication Data
US 2017/0042095 A1 Feb. 16, 2017

Related U.S. Application Data

(60) Provisional application No. 61/985,266, filed on Apr. 28, 2014.

(51) Int. Cl.
*G06F 7/00* (2006.01)
*A01G 1/04* (2006.01)
(Continued)

(52) U.S. Cl.
CPC ............. *A01G 1/04* (2013.01); *A01D 45/005* (2013.01); *B25J 9/163* (2013.01); *B25J 9/1697* (2013.01);
(Continued)

(58) Field of Classification Search
None
See application file for complete search history.

(56) References Cited

U.S. PATENT DOCUMENTS 5,058,368 A 10/1991 Wheeler
5,185,989 A 2/1993 Russell et al.
(Continued)

FOREIGN PATENT DOCUMENTS

CN 101950183 A 1/2011
CN 101995077 A 2/2011
(Continued)

OTHER PUBLICATIONS

International Search Report and Written Opinion on PCT/CA2015/050321 dated Jul. 9, 2015.
Astract of JPS 60259182, Dec. 21, 1985, Watanabe.

*Primary Examiner* — Yolanda Cumbess
(74) *Attorney, Agent, or Firm* — Brunet & Co. Ltd.; Hans Koenig

(57) ABSTRACT

A method and system for controlling harvesting of mushrooms from a bed during a mushroom graze harvest operation account for both mushroom separation and stagger, thereby providing for automatic and proper selection of which mushrooms in the bed are to be harvested in a given shift.

20 Claims, 2 Drawing Sheets

(51) Int. Cl.
  *A01D 45/00* (2006.01)
  *B25J 9/16* (2006.01)
(52) U.S. Cl.
  CPC ............ *Y10S 901/31* (2013.01); *Y10S 901/40* (2013.01); *Y10S 901/47* (2013.01)

(56) References Cited

U.S. PATENT DOCUMENTS

| | | | |
|---|---|---|---|
| 5,471,827 A | 12/1995 | Janssen et al. | |
| 5,919,507 A * | 7/1999 | Beelman | A23B 7/0441 426/268 |
| 7,854,108 B2 | 12/2010 | Koselka et al. | |
| 8,033,087 B2 | 10/2011 | Rapila et al. | |
| 8,381,501 B2 | 2/2013 | Koselka et al. | |
| 2005/0268587 A1 | 12/2005 | McKeown | |
| 2009/0188771 A1* | 7/2009 | Van Den Top | A01D 45/005 198/312 |

FOREIGN PATENT DOCUMENTS

| | | |
|---|---|---|
| CN | 102508470 A | 6/2012 |
| CN | 202444835 U | 9/2012 |
| CN | 102792854 A | 11/2012 |
| CN | 202713988 U | 2/2013 |
| CN | 103226348 A | 7/2013 |
| CN | 103247006 A | 8/2013 |
| JP | H03160927 A | 7/1991 |
| NL | 86/00887 A | 11/1987 |
| WO | 91/11902 | 8/1991 |

\* cited by examiner

GRAZE HARVESTING OF MUSHROOMS

CROSS-REFERENCE TO RELATED APPLICATIONS

This application is a national phase entry application of International Patent Application PCT/CA2015/050321 filed Apr. 17, 2015, and claims the benefit of U.S. Provisional Patent Application Ser. No. 61/985,266 filed Apr. 28, 2014, the entire contents of both of which are herein incorporated by reference.

FIELD

This application relates to a method and system for harvesting mushrooms from a mushroom bed.

BACKGROUND

Graze harvesting of mushrooms involves strategic harvesting of mushrooms from a bed of mushrooms in order to maximize crop yield. The process is significantly more complex than just harvesting the large size mushrooms. It also includes the identification and harvesting of smaller sized mushrooms in order to provide room for adjacent, larger mushrooms to grow to maximum size. This aspect is termed "separation" in the mushroom growing industry. The harvest strategy must also take into account the generational differences for the mushrooms in the bed such that there are consistently mushrooms available to harvest throughout the harvest process. This process is called "stagger". Control of both separation and stagger is important for efficiently harvesting a harvesting bed on an ongoing basis.

Currently, graze harvesting of mushrooms is being conducted manually at mushroom farms. Differences in operator training and experience results in variation in the harvest results and reduces crop yield. Further, manual harvesting is typically conducted during a single 10 hour shift per day which implies that the mushrooms are allowed to grow in a more-or-less uncontrolled state over each night.

There are a few methods in the art that use cameras for locating and measuring cap diameters of mushrooms in a mushroom bed before harvesting the mushrooms with a mechanical picker. However, such methods do not provide for automatically selecting and picking mushrooms based on both separation and stagger. Camera-based apparatuses for locating and measuring mushrooms in a mushroom bed are described in, for example, NL 86/00887, U.S. Pat. No. 5,058,368, U.S. Pat. No. 5,471,827 U.S. Pat. No. 8,033,087 and U.S. 2005-0268587, the contents of each of which is hereby incorporated by reference.

There remains a need for automated methods and systems for harvesting mushrooms from a mushroom bed where both separation and stagger are automatically controlled.

SUMMARY

There is provided a method of graze harvesting mushrooms comprising the steps of: measuring cap diameters of mushrooms growing in a mushroom bed, whereby any mushrooms having a cap diameter equal to or greater than a pre-set value are to be picked; locating centroid positions of each mushroom in the bed having a cap diameter greater than a pre-determined value, and for each mushroom for which the centroid position was located calculating centroid-to-centroid distances from each mushroom to each neighboring mushroom, comparing the centroid-to-centroid distances for two mushrooms to sum of radii for the two mushrooms, whereby if the centroid-to-centroid distance is less than or equal to the sum of the radii then there is interference between the two mushrooms, and counting the number of interfering mushrooms to identify clumps of mushrooms to be thinned; and, identifying the mushrooms to be picked based on steps (a) to (b) and picking the identified mushrooms.

There is also provided a system for harvesting mushrooms from a bed, the system comprising: one or more mushroom harvesters configured to pick mushrooms from the bed; one or more cameras for locating mushrooms in the bed and measuring cap diameters of the mushrooms; and, a control apparatus operatively linked to the one or more cameras and the one or more mushroom harvesters, wherein the control apparatus is configured to receive image data from the one or more cameras and from the image data to determine cap diameters of the mushrooms, locate centroid positions of mushrooms having a cap diameter greater than a pre-determined value, and for mushrooms for which the centroid position was located calculate centroid-to-centroid distances to each neighboring mushroom, compare the centroid-to-centroid distances for sets of two mushrooms to sum of radii for the two mushrooms, count the number of interfering mushrooms to identify clumps of mushrooms to be thinned and determine which mushrooms to pick from the identified clumps of mushrooms, and wherein the control apparatus is configured to aid or operate the one or more mushroom harvesters to pick mushrooms having cap diameters equal to or greater than a pre-set value and pick the mushrooms determined to be picked from the identified clumps of mushrooms.

The method and system provide for controlling harvesting of mushrooms during a mushroom graze harvest operation is provided. The method and system provide for the automatic and proper selection of which mushrooms in a bed are to be harvested in a given shift. Both separation and stagger are automatically controlled. Separation is the identification of which mushrooms to pick to provide room for adjacent mushrooms to grow larger. Stagger is accounting for generational differences to ensure that there are always mushrooms to harvest.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1:
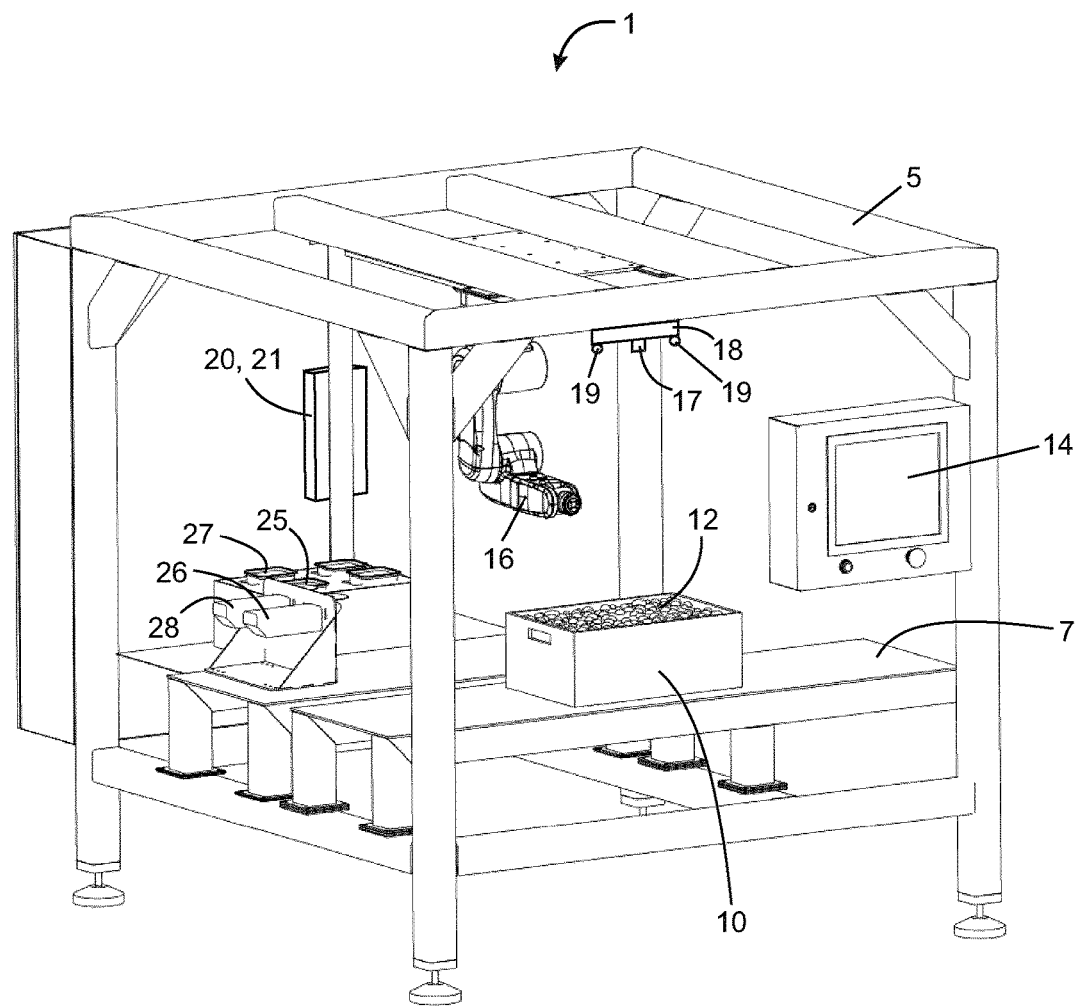
FIG. 1 depicts a mushroom harvesting work cell comprising a system of the present invention.

The system comprises one or more cameras, one or more mushroom harvesters and a control apparatus.

One or more cameras may be provided for supplying image data to the control apparatus for locating mushrooms in the bed and measuring cap diameters of the mushrooms. Location data derived from the image data may be used to determine the centroid positions of mushrooms. Centroid positions and cap diameters may be used to calculate centroid-to-centroid distances from each mushroom to each neighboring mushroom and compare the centroid-to-centroid distances for neighboring mushrooms to the sum of the radii for the neighboring mushrooms. Any suitable type of camera may be used. The cameras preferably have sufficient resolution to resolve individual mushrooms, or at least to resolve tightly grouped sets of mushrooms from other tightly group sets mushrooms. Digital cameras are of particular use as they are more easily interfaced with the control apparatus. The cameras may be operatively linked to, for example in electronic communication with, the control apparatus to facilitate data transfer from the cameras to the control apparatus and to permit the control apparatus to automatically control the motion and settings of the cameras. The cameras may be configured to take still images, video images or both.

One or more mushroom harvesters may be configured to pick mushrooms from the bed. The harvesters may be human or may be mechanical for example suitably robotic mushroom pickers, many of which are known in the art. A particularly suitable example of a robotic picker comprises a picker that employs a gripper, for example a pincer, an adhesive or a suction cup, at the end of a robotic arm. The harvesters may be operatively linked to, for example in electronic communication with, the control apparatus to aid the harvesters in picking mushrooms and/or to facilitate automatic control of the harvesters by the control apparatus. For aiding or controlling the operation of the harvesters, the control apparatus comprises software. Where the harvesters comprise robotic pickers, the software controls movements of the harvesters, for example spatial translation of a robotic arm to position a suction cup over a mushroom cap, rotation of the suction cup to loosen the mushroom from the bed and translation of the arm to remove the mushroom from the bed and transport the mushroom to a storage area. The use of mechanical harvesters, for example robotic pickers, permits automatic harvesting of mushrooms without human intervention except to set the control parameters and initiate instructions for the system to begin picking.

Control software for performing the method may be embodied in the control apparatus operatively linked to, for example in electronic communication with, the one or more cameras and/or to the one or more mushroom harvesting apparatuses. Electronic communication may be provided through wires or wirelessly. The control apparatus may comprise, for example, a computer, an output device and an input device, the computer comprising a microprocessor for controlling operations and a non-transient electronic storage medium for storing information about the mushrooms and bed and/or for storing computer executable code for carrying out instructions for implementing the method. The computer may further comprise a transient memory (e.g. random access memory (RAM)) accessible to the microprocessor while executing the code. A plurality of computer-based apparatuses may be connected to one another over a computer network system and geographically distributed. One or more of the computer-based apparatuses in the computer network system may comprise a microprocessor for controlling operations and a non-transient electronic storage medium for storing information about the mushrooms and bed and/or for storing computer executable code for carrying out instructions for implementing the method, and the computer-based apparatuses in the network may interact so that the harvesting operation may be carried out automatically from remote locations. The output device may be a monitor, a printer, a device that interfaces with a remote output device or the like. The input device may be a keyboard, a mouse, a microphone, a device that interfaces with a remote input device or the like. With a computer, data (e.g. images from cameras) may be a graphically displayed in the output device. There is also provided a computer readable non-transient storage medium having computer readable code stored thereon for executing computer executable instructions for carrying out the method.

While the control software may automatically perform the method, the input device of the control apparatus allows an operator to have control of various parameters for optimizing the process. In one embodiment, one or more of the following parameters may be controlled by the operator or an automated expert subsystem: overlap, crowding, minimum separation, maximum separation and graze picking threshold. Overlap is the maximum amount of overlap allowed between adjacent mushrooms. Crowding is the maximum number of mushroom allowed around a specific mushroom. Minimum separation is the minimum mushroom cap diameter allowed to be harvested during the separation/stagger process. Maximum separation is the maximum mushroom cap diameter allowed to be harvested during the separation/stagger process. Graze picking threshold is the minimum mushroom cap diameter to be harvested during a particular graze harvest cycle.

Criteria for the minimum mushroom diameter range to pick during the separation process (the minimum pre-set value) can vary from mushroom farm to mushroom farm, but is preferably in a range of 20 mm to 30 mm. The criteria may be incorporated into the harvest cell control software. The pre-set value and/or the following control variables may be set and/or changed by an automated expert subsystem or by an operator from the operator interface, e.g. a touchscreen.

Overlap and Crowding Variables: These control variables are based on the concept of interference between adjacent mushrooms causing a relative force vector between the mushrooms. Overlap is a measure of the sum of all force vectors impacting each mushroom caused by interference with adjacent mushrooms. Crowding is a measure of sum of force vectors divided by mushroom diameters. An example of this variable is a large mushroom surrounded by relatively small mushrooms. Separation in this area is less critical since the large mushroom will be taller than the adjacent small mushrooms.

Minimum Separation Variable: Provides the ability to adjust the minimum mushroom diameter to be included in the separation process to a diameter less than 20 mm.

Maximum Separation Variable: Provides the ability to adjust the maximum mushroom diameter to be included in the separation process to a diameter greater than 30 mm.

Graze Picking Threshold: Provide the ability to adjust the graze harvest criteria from those noted above.

Mushroom tracking versus time: The harvest system control software maintains data in memory for every bin that is photographed and harvested. The control software may also track location and diameter for every mushroom in the crop individually. This data would be used to further improve control of the harvest process. There are instances where mushroom cap diameters stop growing and all further growth is in stem length. With this software functionality in place, the system will be able to identify these situations and these mushrooms can be harvested.

In one embodiment, when a bed of mushrooms is introduced to an automated harvesting system of the present invention, a camera takes a digital photograph of the bed and the data is processed through software to locate each mushroom and measure its cap diameter. Thereafter, the data for each mushroom is compared to programmed criteria for graze harvest and separation/stagger.

For the graze harvest function, each mushroom cap diameter is compared to a profile for minimum mushroom cap diameter to be graze harvested for each day of crop. Any mushrooms with cap diameters equal to or greater than the minimum mushroom cap diameter for that day will be automatically harvested. The minimum pre-set value of cap diameter for harvesting a mushroom in a particular graze is preferably greater than or equal to the pre-determined value for calculating the centroid position of the mushroom. The pre-set value is preferably set to no lower than the lowest mushroom size that is marketable, and may vary from mushroom farm to mushroom farm. For example, a minimum pre-set value may be 20 mm.

For the separation/stagger function, the software calculates the centroid position for every mushroom in the bed with a cap diameter greater than the pre-determined value, for example greater than about 10 mm. The pre-determined value may be the same or different than the pre-set value described above. Subsequently the software automatically processes the following steps for every mushroom in the bed:

1. Calculates the centroid-to-centroid distance between each mushroom and each of its neighbors.
2. Compares the centroid-to-centroid distances with the sum of the radii for the mushrooms in question. If the centroid-to-centroid distance for any two mushrooms is less than or equal to the sum of the radii, interference exists between the two mushrooms. The software evaluates every mushroom interaction on the bed concurrently.
3. The software counts the number of mushrooms interacting with each mushroom to identify area of mushroom clumps that require thinning.

Employing the parameters noted above, the software automatically determines which mushrooms must be removed from the mushroom bed in order to ensure space for other mushrooms to grow to optimal size.

The software provides the operator or automated expert subsystem control of key function parameters. As such the software can be tuned to the specific needs of the mushroom farm, for example overall output, selection of mushroom grade (triggered for example by changes in revenue associated with mushroom grades), and the like.

In some embodiments, a typical crop of mushrooms may be harvested over a period of about 12 days comprising two 5-day "flushes" of mushrooms separated by a 2-day "interflush" period where no mushrooms are harvested. In one embodiment, a typical graze harvest profile may comprise:

Flush 1 Day 1: Graze harvest all mushrooms 55 mm diameter or greater
Flush 1 Day 2: Graze harvest all mushrooms 50 mm diameter or greater
Flush 1 Day 3: Graze harvest all mushrooms 45 mm diameter or greater
Flush 1 Day 4: Graze harvest all mushrooms 40 mm diameter or greater
Flush 1 Day 5: Harvest all mushrooms 20 mm diameter or greater from the bed
Interflush Days 6-7
Flush 2 Day 8: Graze harvest all mushrooms 55 mm diameter or greater
Flush 2 Day 9: Graze harvest all mushrooms 50 mm diameter or greater
Flush 2 Day 10: Graze harvest all mushrooms 45 mm diameter or greater
Flush 2 Day 11: Graze harvest all mushrooms 40 mm diameter or greater
Flush 2 Day 12: Harvest all mushrooms 20 mm diameter or greater from the bed Further, each mushroom's cap diameter may be tracked over time and compared to expected growth rates. If mushroom cap growth rate at subsequent harvest cycles do not achieve expected rates, the mushroom could be harvested. Expected growth rates may be determined from historical mushroom cap diameter data stored in the control apparatus. Thus, if mushroom cap diameter does not grow an expected amount in a given time period, it can be expected that stem is growing instead of the mushroom cap. At this point the mushroom should be harvested.

Methods for calculating the centroid position of a mushroom from photographic data are known in the art. A typical, industry-standard methodology to find the centroid location of a round object would be as follows. Locate general areas of contrasting pixel color (i.e. white pixels of mushroom cap on black casing background). In vision system development art this is called "blob-find". Locate the line within each "blob" where the white pixels transition to black to identify the "blob" outline. Identify the centroid of the outlined shape.

While prior art methods of finding centroid positions may be suitable in some cases, problems may arise in areas of the bed where mushrooms overlap. Mushrooms grow in random positions in the mushroom bed and are often directly adjacent to and overlapping with other mushrooms. In these areas, it can be very difficult or impossible for a prior art vision system to automatically locate the separate outline between the two mushrooms. Typically, a vision system will therefore identify multiple mushrooms as a single, odd-shaped "blob" with an incorrect centroid location. An incorrect centroid location sent to the harvesting apparatus may lead to a failed harvest attempt.

In order to address this problem, the present invention may incorporate the following method to locate the mushroom centroid location. Locate "blob" of contrasting pixel colors. Locate "blob" outline and centroid. Create a vector line from the centroid position to the "blob" edge at an angle of 0 degrees. Repeat many times at incremented angles to locate many individual points on the edge of the "blob". Evaluate the different vector line lengths and delete any lines which are too long or too short. Vector lines which are too long or too short indicate that they are the result of interference with adjacent mushrooms. Fit a curve to the remaining vector lines to identify the "real" edge of the mushroom cap. Recalculate mushroom cap diameter and centroid location. This is a much more accurate method to locate the correct location for a mushroom to be picked by the harvesting apparatus.

With reference to FIG. 1, a mushroom harvesting work cell 1 comprising an embodiment of a system of the present invention is depicted. The cell 1 comprises a frame 5 on which components of the system are mounted. The system comprises: a mushroom tray 10 in which mushrooms 12 are growing in a growth mixture; a user interface 14, in this case a touch screen, in electronic communication with a computer 20, in this case mounted in an electrical panel 21 of the system on the frame 5; a robotic arm 16 in electronic communication with the computer 20 and configured to pick mushrooms 12 from the mushroom tray 10; a camera assembly 18 including a digital camera 17 and lights 19 to provide stable illumination of the tray 10, in electronic communication with the computer 20 and configured to take images of the mushroom tray 10; and first and second trim stations 25, 27 configured to receive picked mushrooms from the robotic arm 16 and then trim the stems of the picked mushrooms.

In operation, the harvesting cycle first begins with the mushroom tray 10 being loaded onto a table 7 supported at a front of the frame 5 where a digital image of the mushroom tray 10 is captured by the digital camera 18. With predetermined picking settings, the computer 20 will find all mushrooms 12 in the mushroom tray 10 and will determine which mushrooms 12 will be picked based on the method described above. While the computer 20 is finding and calculating which mushrooms 12 should be picked, the tray 10 is moved to a picking position under the robotic arm 16, and when the calculations are complete the robotic arm 16 commence picking of the selected mushrooms. The robotic arm 16 transfers a mushroom to the first trim station 25 where the stem of the mushroom is trimmed right above the root structure of the mushroom. The mushroom root structure is collected into a bin through first chute 26 for disposal. The mushroom without the root structure is then transferred by the robotic arm 16 to the second trim station 27 where the mushroom stem is cut at a specified length relative to the diameter of the mushroom cap. The stem section is collected into a separate bin through second chute 28, and can be sold by the mushroom grower to food processors who will use the stems as an ingredient in, for example, soups and sauces. The trimmed mushroom may then be transferred by the robotic arm 16 or some other mechanism to a mushroom packaging system (not shown).

It should be noted that the method and system of graze harvesting and software associated therewith does not necessarily need to be tied to a robotic picking apparatus. The camera, lighting, software and other components of the system may be employed to locate and target mushrooms to be harvested as above. The actual mushroom harvesting may be conducted manually where the harvester is guided by the software. For example, the mushrooms targeted by the system could be displayed to the harvester on a monitor screen or goggles.

Figure 2:
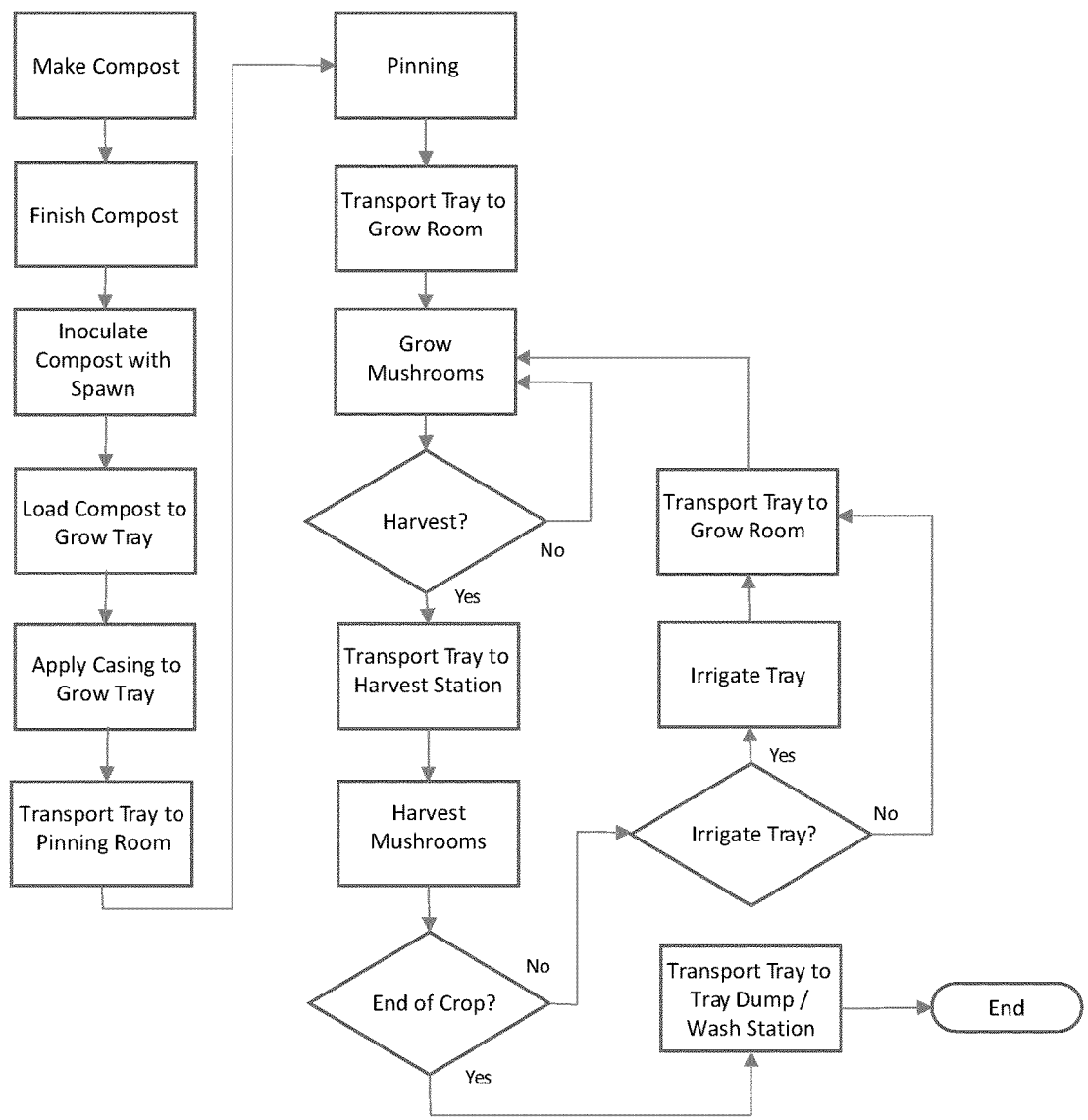
FIG. 2 is a flow chart depicting steps in a mushroom farm production system utilizing the method and system of the present invention.

The present invention permits automation, in whole or in part, of a mushroom farm production system. One such production system is illustrated in FIG. 2. The general production system described in more detail below is a departure from the current state of the mushroom farming industry. Industry current practice comprises growing mushrooms in large, multi-layer shelves. Mushrooms are harvested manually by laborers travelling along the length of the fixed trays. The limited space between the layers of mushroom trays precludes the introduction of many types of automation to the process. The growing of mushrooms in smaller transportable trays allows for the introduction of automation to the mushroom farm process. The mushroom trays can be transported automatically by conveyor between different automated stations. Each mushroom tray may incorporate a tracking device, e.g. an RFID tag, which provides serial identification. Readers at operation stations and strategic locations within the tray transport conveyor system ensure correct tray trafficking and operations.

A process control system comprises hardware and software used to control all or almost all aspects of the production process. Process control may be centralized in a single computer programmed with expert subsystems to make decisions based on data collected from tracking devices, cameras and other sensors, and then provide instructions to other hardware components of the system to perform various functions.

Referring to FIG. 2, a mushroom farm production process involving automated systems may comprise a number of steps.

Make Compost:

Compost may be produced in batches employing traditional methods. Different mushroom farms tend to have their own proprietary compost recipe and process. Robotic equipment (e.g. collectors, mixers, transporters, etc.) may be used during compost production, if desired, and operation of such equipment may be controlled by the control system in response to data collected over the whole production system.

Finish Compost:

Compost may be finished employing traditional methods. After completion of the composting process, the compost may be pasteurized to kill any insects, pests or fungi that are present in the compost. In addition, the compost may be be aerated to reduce ammonia concentration to levels that are not lethal to mushroom spawn growth. Robotic equipment (e.g. automated pasteurizers, aerators, etc.) may be used, if desired, during compost finishing, and operation of such equipment may be controlled by the control system in response to data collected over the whole production system.

Inoculate Compost with Spawn:

Mushroom spawn may be purchased by the farm from commercial suppliers who specialize in its production. The spawn comprises a grain such as rye, wheat, millet or other which has been colonized by mushroom mycelium. The spawn may be mixed uniformly into the finished compost using traditional methods. Inoculation and mixing may be accomplished, if desired, with robotic injectors and mixers controlled by the control system in response to data collected over the whole production system.

Load Compost to Tray:

Traditionally mushrooms are grown in large, static trays. Instead, the inoculated compost may be loaded into small, transportable trays which can be moved to different locations by a conveyor system. A typical grow tray size would be 24" L×18" W×9" H. Other tray sizes are possible. Each tray may incorporate an RFID tag which identifies and permits tracking of each individual tray.

In a batch operation, a number of trays may be loaded from a single batch of compost. At the completion of compost loading and in all subsequent operations, the tray RFID tags may be read by an RFID reader mounted at a station. The process control system may be updated to record the tray number, date, time and successful operation completion. In this way, the process control system is able to track the status and location of each individual grow tray, and then transmit instructions to other automated equipment in the production system based on data collected from the trays. The trays may be subsequently transported automatically by conveyor to a casing station.

Apply Casing to Tray:

Casing is a dressing applied evenly on top of the compost. Casing may be produced in batches by the mushroom farm using traditional methods. The casing may be automatically dispensed onto the tray from a hopper. Thereafter, a pneumatic press may be employed to compress the compost and casing within the tray. Upon successful operation completion, the tray RFID tag may be read and the process control system updated. The tray may be then released from the casing station.

Transport Tray to Pinning Room:

The tray may be transported automatically by conveyor to the pinning room. The RFID tag on each tray may be read by RFID readers integrated into the conveyor system to ensure the tray is sent to the correct location.

Conduct Pinning:

Pinning room environment may be controlled to support growth of mycelium throughout the compost. At an appropriate time, carbon dioxide concentration within the pinning room may be reduced below the threshold to initiate fruiting of mushrooms through the casing. Appropriate carbon dioxide level parameters may be encoded in the control system, and the control system may comprise carbon dioxide sensors to monitor carbon dioxide levels in the pinning room. An expert subsystem of the control system may process the signals from the carbon dioxide sensors and transmit appropriate instructions to carbon dioxide control equipment to ensure that the level of carbon dioxide in the pinning room remains within an operational range to support the growth of the mycelium. Such automated control may also be exerted over other environmental parameters in the pinning room, for example humidity and temperature using appropriate sensors and humidity and temperature control equipment.

Transport Tray to Grow Room:

The tray may be transported automatically by conveyor to the grow room. The RFID tag on each tray may be read by RFID readers integrated into the conveyor system to ensure the tray is sent to the correct location within the grow room. Environmental conditions (e.g. humidity, temperature, illumination, and the like) within the grow room may be maintained at optimal levels to support mushroom growth. An expert subsystem of the control system may process the signals from various sensors and transmit appropriate instructions to control equipment to ensure that the environmental parameters in the grow room remains within an operational range to support the growth of the mushrooms. The tray location within the grow room may be maintained at all times within the control system program. Individual trays may be cycled through different locations within the grow room in order offset any variation in environment conditions within the room. The use of multiple sensors in different areas of the room facilitates determination of variations. Locations of trays may be changed automatically on instructions from the control system to conveyors in the grow room.

Decision: Release Tray for Harvest:

The control system may automatically determine the correct time to release each tray to a harvest station. The decision to release a tray for harvest is based on a number of variables.

a. The first harvest cycle of a tray may be conducted during the first day after transfer of the trays into the grow room. During this initial harvest cycle, any mushrooms of harvest size may be harvested. The processed digital data identifying the size and location of each mushroom in the tray may be stored in the control system.

b. The crop cycle day may also dictate when trays may be released for harvest. The crop typically runs through an initial flush of approx. 5 days where mushrooms can be harvested. Thereafter there is approximately 2 days where no mushrooms grow followed by a second flush of new mushroom growth.

c. In general, a harvest cycle may be conducted on each tray at a pre-set duration of, for example, 2-4 hours. Duration lengths may be varied automatically by the control system throughout the harvest process based on data collected at the various parts of the production system.

d. The processed digital data may also be used to determine optimal time to send an individual tray for harvest. Each time an individual tray is sent through the harvest process, location and size data for every mushroom present may be captured. Over time, this data may be used to develop growth rate curves for mushrooms, which may be stored in the control system. The growth rate curves could then be used by an expert subsystem of the control system to predict the sizes of mushrooms in a bed at a point in the future. In this way, trays could be released for harvest based on the presence of harvestable mushrooms instead of a time duration setting in the process control system software.

Transport Tray to Harvest:

The tray may be transported automatically by conveyor to a robotic harvest station. The RFID tag on each tray may be read by RFID readers integrated into the conveyor system to ensure the tray is sent to the correct location.

Harvest Mushrooms:

The robotic harvest station may identify the size and location of every mushroom present in the tray, as described above. Mushrooms that fit program criteria for harvest or separation may be harvested. In addition, historical size data for individual mushrooms may also be employed by an expert subsystem of the control system to determine when to harvest. If historical cap diameter data for an individual mushroom indicates insufficient cap diameter growth in a set period of time, that mushroom may be harvested.

Decision: End of Crop:

At the end of the first flush of mushrooms from each tray, the trays may be cycled back to the grow room for continued mushroom growth. If required, the trays may pass through an irrigation station before being cycled back to the grow room.

At the end of the second flush of mushrooms from each tray, the tray may be diverted from production to a tray dump and wash station. Washed trays may be used to re-initiate the production process.

Irrigation Station:

The mushroom trays may require irrigation during the time period between the first and second flushes. An irrigation station may be utilized subsequent to the harvest station and trays may be irrigated as required. The tray RFID tag may be read when the tray arrives at the irrigation station. The control system may dictate which trays get irrigated and which do not, for example based on information collected from sensors that sense the humidity levels in each tray. The control system may send instructions to automatic irrigating equipment to either irrigate a tray or let the tray pass without irrigation. The extent of irrigation in a tray may also be controlled by an expert subsystem of the control system in response to the measured humidity level in the tray.

Transport Tray to Grow Room:

The tray may be transported automatically by conveyor from the irrigation station to the grow room. The RFID tag on each tray may be read by RFID readers integrated into the conveyor system to ensure the tray is sent to the correct location within the grow room.

Transport Tray to Tray Dump & Wash Station:

Trays that have achieved end of crop are automatically transported to a tray dump and wash station. The tray contents are dumped and the trays are washed to prepare them for the next crop cycle.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A method of graze harvesting mushrooms comprising the steps of:
   (a) measuring cap diameters of mushrooms growing in a mushroom bed, whereby any mushrooms having a cap diameter equal to or greater than a pre-set value are to be picked;
   (b) locating centroid positions of each mushroom in the bed having a cap diameter greater than a pre-determined value, and for each mushroom for which the centroid position was located
      (i) calculating centroid-to-centroid distances from each mushroom to each neighboring mushroom,
      (ii) comparing the centroid-to-centroid distances for two mushrooms to sum of radii for the two mushrooms, whereby if the centroid-to-centroid distance is less than or equal to the sum of the radii then there is interference between the two mushrooms, and
      (iii) counting the number of interfering mushrooms to identify clumps of mushrooms to be thinned; and,
   (c) identifying the mushrooms to be picked based on steps (a) to (b) and picking the identified mushrooms.

2. The method according to claim 1, wherein measuring cap diameters, locating centroid positions, calculating centroid-to-centroid distances, comparing the centroid-to-centroid distances, counting the number of interfering mushrooms and identifying the mushrooms to be picked are performed automatically by a control apparatus.

3. The method according to claim 2, wherein the control apparatus receives image data from one or more cameras, the image data comprising an image of the mushrooms growing in the bed, wherein the control apparatus uses the image data to measure cap diameters, locate centroid positions, calculate centroid-to-centroid distances, compare the centroid-to-centroid distances, count the number of interfering mushrooms and identify the mushrooms to be picked.

4. The method according to claim 1, wherein locating the centroid position of an individual mushroom comprises locating a blob of contrasting pixel colors on a digital photograph of the bed, locating an outline and centroid of the blob, creating a vector line from the centroid of the blob to an edge of the blob at an angle of 0 degrees, repeating a plurality of times at incremented angles to locate a plurality of individual points on the edge of the blob, evaluating different vector line lengths and deleting any lines whose lengths indicate interference with adjacent mushrooms, and fitting a curve to the remaining vector lines to identify an edge of a cap of the individual mushroom.

5. The method according to claim 1, wherein the pre-determined value is 10 mm and the pre-set value is 20 mm.

6. The method according to claim 1, wherein the pre-set value is set automatically by an expert system.

7. The method according to claim 1, wherein the mushrooms are harvested over a period of time in a series of flushes where each flush in the series has a different pre-set value and the pre-set value is smaller in each subsequent flush.

8. The method according to claim 7, wherein the pre-set value is adjustable by an operator.

9. The method according to claim 7, comprising a plurality of series of flushes separated by interflush periods.

10. The method according to claim 1, wherein one or more of overlap, crowding, minimum separation, maximum separation and graze picking threshold is adjustable by an operator.

11. The method according to claim 1, wherein the mushroom cap diameters are tracked over time and compared to expected growth rates based on historical mushroom cap diameter data, and mushrooms whose cap diameters do not grow at the expected growth rate are harvested.

12. A computer readable non-transient storage medium having computer readable code stored thereon for executing computer executable instructions for carrying out the method as defined in claim 1.

13. The method according to claim 1, wherein one or more of overlap, crowding, minimum separation, maximum separation and graze picking threshold is adjustable by an automated expert subsystem.

14. The method according to claim 1, wherein the mushroom cap diameters are tracked over time and compared to expected growth rates based on historical mushroom cap diameter data, and mushrooms that are expected to hinder growth of neighbouring mushrooms are harvested.

15. The method according to claim 1, wherein identifying the mushrooms to be picked is performed by an expert system and picking the identified mushrooms is done manually by a human harvester guided by the expert system.

16. A system for harvesting mushrooms from a bed, the system comprising:
   (a) one or more mushroom harvesters configured to pick mushrooms from the bed;
   (b) one or more cameras for locating mushrooms in the bed and measuring cap diameters of the mushrooms; and,
   (c) a control apparatus operatively linked to the one or more cameras and operatively associated with the one or more mushroom harvesters,
   wherein the control apparatus is configured to receive image data from the one or more cameras and from the image data to
      determine cap diameters of the mushrooms,
      locate centroid positions of mushrooms having a cap diameter greater than a pre-determined value,
      and for mushrooms for which the centroid position was located calculate centroid-to-centroid distances to each neighboring mushroom, compare the centroid-to-centroid distances for sets of two mushrooms to sum of radii for the two mushrooms, count the number of interfering mushrooms to identify clumps of mushrooms to be thinned and determine which mushrooms to pick from the identified clumps of mushrooms,
   and wherein the control apparatus is configured to aid or operate the one or more mushroom harvesters to pick mushrooms having cap diameters equal to or greater than a pre-set value and pick the mushrooms determined to be picked from the identified clumps of mushrooms.

17. The system according to claim 16, wherein the one or more mushroom harvesters comprises one or more mechanical mushroom pickers operated automatically by the control apparatus using control software.

18. The system according to claim 17, wherein the one or more mechanical mushroom pickers comprises one or more robotic mushroom pickers comprising grippers.

19. The system according to claim 17, wherein the one or more mechanical mushroom pickers comprises one or more robotic mushroom pickers comprising suction cups.

20. The system according to claim 16, wherein the control apparatus is in electronic communication with the one or more mushroom harvesting apparatuses and the one or more cameras.

\* \* \* \* \*